July 10, 1951     C. HETTINGER     2,559,819
MACHINE FOR AUTOMATICALLY PACKAGING ARTICLES
Filed July 18, 1946
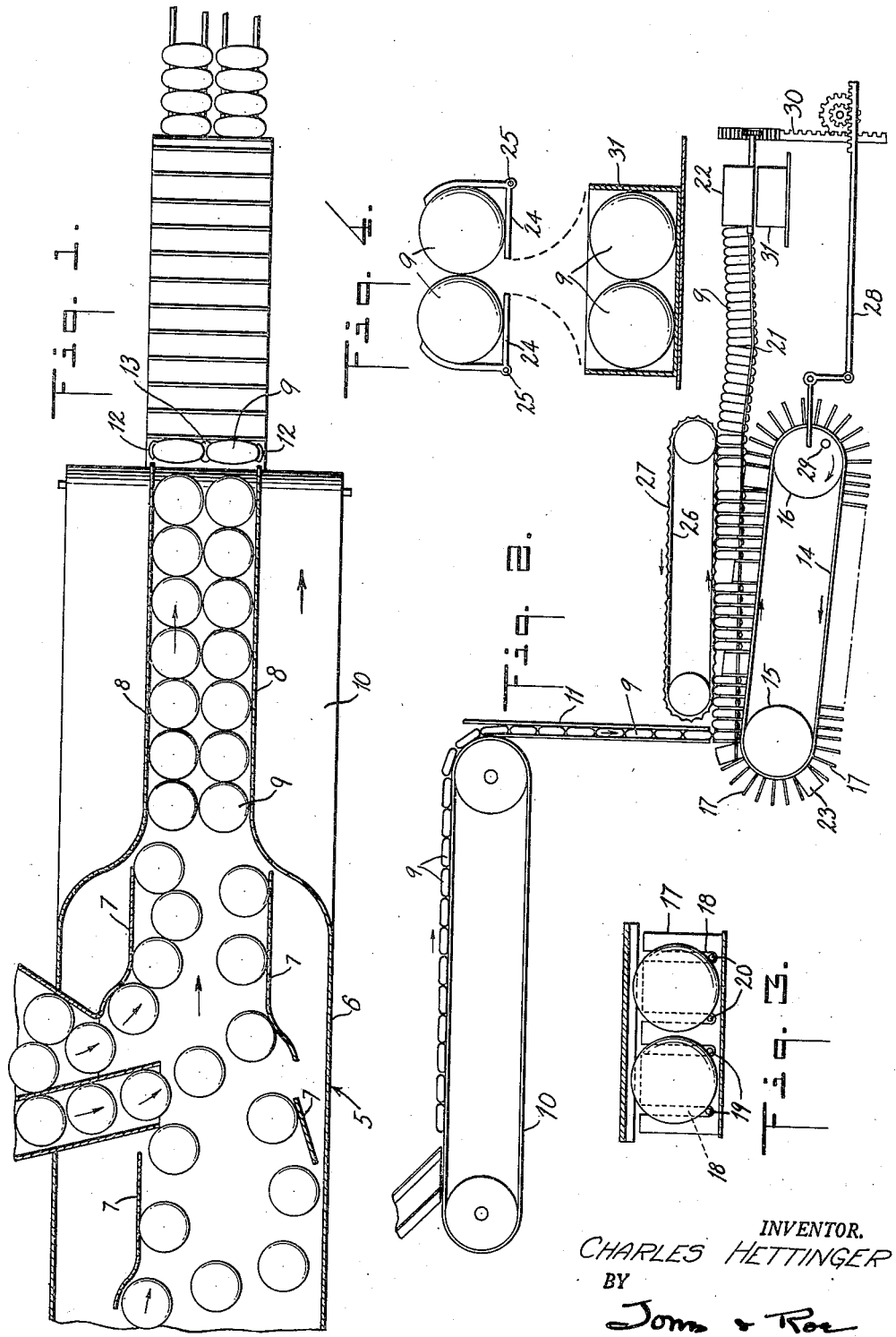
INVENTOR.
CHARLES HETTINGER
BY
Jones & Roe
ATTORNEYS Patented July 10, 1951

2,559,819

UNITED STATES PATENT OFFICE 2,559,819

MACHINE FOR AUTOMATICALLY PACKAGING ARTICLES

Charles Hettinger, West Englewood, N. J.

Application July 18, 1946, Serial No. 684,408

9 Claims. (Cl. 214—7)

This invention contemplates a machine for automatically packaging articles wherein they are carried from a horizontal to a vertical position and a predetermined number thereof deposited in a suitable container.

In the illustrated embodiment of the invention I have shown and will describe the machine as designed for packaging doughnuts which are constituted into two rows of six doughnuts in each row and then deposited in a box.

In the drawings:

Fig. 1. is a top plan view of the apparatus.

Fig. 2 is a side elevation.

Fig. 3 is a transverse section of the conveyor belt showing one of the fins, and Fig. 4 is a side elevation of the trap doors and container.

Referring to the drawings in detail, 5 designates generally a guideway which is suitably connected to a sugar machine (not shown), and which comprises side walls 6, directionals 7, and a constricted neck 8 for feeding doughnuts 9 along conveyor 10. At the outer end of the conveyor is a vertically disposed chute 11 formed of parallel side members 12 and an intermediate spacing element 13, the said members and element being transversely curved to correspond to the contour of the outer edges of the doughnuts. The lower terminal of chute 11 discharges on an endless inclined conveyor 14 operating over pulleys 15—16, and provided with fins 17 suitably spaced to receive doughnuts 9.

Each fin is vertically slotted at 18 to accommodate two pairs of stationary tracks 19—20, the inner extremities of which are straight while the outer extremities decline and then incline to present a dip 21 just in advance of the housing 22. Collectively, the fins provide pockets for the doughnuts, and at appropriate intervals voids or blanks 23, also slotted, serve to apportion the doughnuts in any desired numbers.

Housing 22 contains a pair of trap doors 24 hinged at 25, and above conveyor 14 is a booster belt 26 having transverse flutes 27 for engaging and assisting in the progress of the doughnuts towards the housing.

Tripping mechanism for trap doors 24, includes linkage 28 actuated by pin 29 on pulley 16, together with rack and pinion 30.

After doughnuts 9 leave the sugar machine, directionals 7 serve to arrange them in rows in neck 8, and conveyor 10 carries them in this relationship into chute 11. The chute then discharges the doughnuts in the pockets between fins 17— two rows of six doughnuts. Through the cooperation of conveyor 14 and booster belt 26 the doughnuts are carried along rods 19—20 until two rows of six each are deposited on trap doors 24, whereupon linkage 28 is tripped by pin 29 and rack and pinion 30 drops the trap doors and thereby permits the doughnuts to fall into box 31.

During the foregoing operation, the action of the rack and pinion 30 in releasing the trap doors 24 and dropping the articles, sets up a vibration which normally would tend to cause some of the articles to fall from the tracks. The dipping of the tracks at 21 overcomes this contingency.

I claim:

1. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, the fins being slotted vertically, stationary tracks arranged in the slots, a booster belt superposed above the last mentioned conveyor and engageable with the upper surface of the articles, and means for depositing predetermined numbers of the articles from the discharge extremity of the tracks.

2. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, the fins being slotted vertically, substantially rectilinear stationary tracks arranged in the slots, the second conveyor belt and the tracks diverging from their inner to their outer ends, a booster belt superposed above the last mentioned conveyor and engageable with the upper surface of the articles, and means for depositing predetermined numbers of the articles from the discharge extremity of the tracks.

3. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, void elements between selective numbers of the fins, the fins and void elements being slotted vertically, stationary tracks arranged in the slots, a transversely fluted booster belt superposed above the last mentioned conveyor and engageable with the upper surface of the articles, and means for depositing predetermined numbers of the articles from the discharge extremity of the tracks.

4. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, void elements between selective numbers of the fins, the fins and void elements being slotted vertically, stationary tracks operable in said slots during a portion of the advance movement of said second conveyor belt, a booster belt superposed above the last mentioned conveyor and engageable with the upper surface of the articles, and means for depositing predetermined numbers of the articles from the discharge extremity of the tracks.

5. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, void elements between selective numbers of the fins, the fins and void elements being slotted vertically, stationary tracks arranged in the slots, a booster belt superposed above the last mentioned conveyor and engageable with the upper surface of the articles, the tracks extending beyond the corresponding outer ends of the second conveyor and the booster belts, and means for depositing predetermined numbers of the articles from the discharge extremity of the tracks.

6. Packaging machinery for doughnuts and the like articles, comprising an endless conveyor belt having fins and interposed void elements, the fins and elements having slots therein, stationary tracks operable in said slots, means for advancing successive transverse rows of articles on to said belt, and means for depositing predetermined numbers of the articles from the discharge extremity of the tracks.

7. Packaging machinery for doughnuts and the like articles, comprising in combination a guideway, a conveyor belt beneath the guideway for advancing successive transverse rows of articles, a chute disposed at the end of the conveyor belt and being open at the front and back, a second conveyor belt at the lower end of the chute, the latter provided with a plurality of spaced fins, the fins being slotted vertically, stationary tracks arranged in the slots, a booster belt superposed above the last mentioned conveyor and engageable with the upper surface of the articles, and means for depositing predetermined numbers of the articles from the discharge extremity of the tracks.

8. Packaging machinery for doughnuts and the like articles, comprising in combination a guideway, a conveyor belt beneath the guideway for advancing successive transverse rows of articles, a chute disposed at the end of the conveyor belt and including substantially vertical side members and an intermediate spacing element, a second conveyor belt at the lower end of the chute, the latter provided with a plurality of spaced fins, the fins being slotted vertically, stationary tracks arranged in the slots, a booster belt superposed above the last mentioned conveyor and engageable with the upper surface of the articles, and means for depositing predetermined numbers of the articles from the discharge extremity of the tracks.

9. Packaging machinery for doughnuts and the like articles, comprising in combination a guideway, a conveyor belt beneath the guideway for advancing successive transverse rows of articles, a chute disposed at the end of the conveyor belt, a second conveyor belt at the lower end of the chute, the latter provided with a plurality of spaced fins, the fins being slotted vertically, stationary tracks arranged in the slots, a booster belt superposed above the last mentioned conveyor and engageable with the upper surface of the articles, and means for depositing predetermined numbers of the articles from the discharge extremity of the tracks, the tracks being dipped between the outer end of the booster belt and their discharge extremity.

CHARLES HETTINGER.

REFERENCES CITED

The following references are of record in the file of this patent:

UNITED STATES PATENTS

| Number | Name | Date |
| --- | --- | --- |
| 1,365,741 | Speer | Jan. 18, 1921 |
| 1,371,456 | Wallace | Mar. 15, 1921 |
| 1,409,224 | McManus | Mar. 14, 1922 |
| 1,763,735 | Wydom | June 17, 1930 |
| 1,774,401 | Quade et al. | Aug. 26, 1930 |
| 2,324,930 | Joa | July 20, 1943 |
| 2,376,651 | Bardet | May 22, 1945 |